United States Patent [19]
Okita

[11] Patent Number: 5,825,512
[45] Date of Patent: Oct. 20, 1998

[54] IMAGE READING METHOD AND APPARATUS

[75] Inventor: Hisao Okita, Kawasaki, Japan

[73] Assignee: Canon Kabushiki Kaisha, Tokyo, Japan

[21] Appl. No.: 381,341

[22] Filed: Jan. 31, 1995

[30] Foreign Application Priority Data

Jan. 31, 1994 [JP] Japan .................................. 6-009064

[51] Int. Cl.$^6$ ........................................................ H04N 1/04
[52] U.S. Cl. ........................... 358/496; 358/498; 358/404; 358/486
[58] Field of Search .................................. 358/496, 497, 358/498, 400, 401, 404, 406, 437, 486

[56] References Cited

U.S. PATENT DOCUMENTS

| | | | |
|---|---|---|---|
| 4,367,496 | 1/1983 | Matteson | 358/496 |
| 4,733,308 | 3/1988 | Nakamura et al. | 358/496 |
| 5,220,437 | 6/1993 | Saegusa et al. | 358/404 |
| 5,517,331 | 5/1996 | Murai et al. | 358/486 |

*Primary Examiner*—Thomas D. Lee
*Attorney, Agent, or Firm*—Fitzpatrick, Cella, Harper & Scinto

[57] ABSTRACT

An image reading method for photo-electrically reading a document sheet image by a reader by relatively moving the document sheet and the reader comprises a first movement step for relatively moving the document sheet and the reader at a first speed to read an image of the document sheet, and a second movement step for relatively moving the document sheet and the reader at a second speed lower than the first speed for the interruption of the reading before the completion of the reading of the image of the document sheet. Also provided is a stop step for stopping the relative movement at the second speed of the document sheet and the reader.

14 Claims, 8 Drawing Sheets

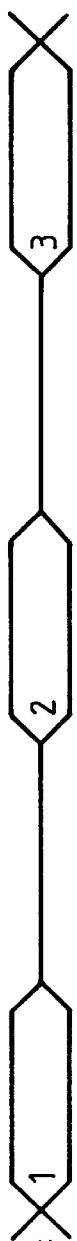
FIG. 3A HSYNC
FIG. 3B PMCK1
FIG. 3C CCD OUTPUT (READING SPEED: STEADY-STATE)
FIG. 3D PMCK2
FIG. 3E CCD OUTPUT (READING SPEED: SLOW-DOWN)

IMAGE READING METHOD AND APPARATUS

BACKGROUND OF THE INVENTION

1. Field of the Invention

The present invention relates to image reading method and apparatus for reading a document sheet by an image sensor and transferring an image signal to the external.

2. Related Background Art

In a prior art external equipment such as a document reader for a computer (hereinafter referred to as a scanner), the reading of a document sheet can be interrupted depending on a processing speed of the computer and a memory capacity. Namely, at any position before the end of the reading of one page of the document sheet, the feed of the document sheet or the drive of an optical system for reading is interrupted, and upon a request to resume the reading, the document sheet or the optical system is driven from the stopped position to resume the reading.

This operation is hereinafter referred to as a start-stop sequence and it is an unavoidable specification unless a memory having a sufficient capacity to store all image information read by the scanner or the computer is provided. During the start-stop sequence, not only the drive control but also the image processing for maintaining the integrity of the image are effected.

On the other hand, the processing speed of the computer and the speed of the communication interface have been increasing recently, and the read speed of the scanner has also been increased to follow the former speed.

As a result, when the start-stop sequence is effected in the conventional manner, a long time is required before the high speed movement is completely stopped so that the distance of the read movement at an unstable speed increases and the discontinuity of the read image of that area is too large to provide the apparatus for a practical use.

In the above start-stop sequence, when the reading of the document sheet is resumed after the interruption of the reading of the document sheet, if the same reading as that done before the interruption of the reading is effected, the start-stop sequence which causes the interruption of the reading of the document sheet may have to be effected again. This will cause the disturbance of the read image, the complexity of the control or the reduction of the efficiency to read the image.

SUMMARY OF THE INVENTION

In light of the above drawbacks, it is an object of the present invention to provide image reading method and apparatus which can efficiently output an image signal derived by reading a document sheet image to an external equipment.

It is another object of the present invention to provide image reading method and apparatus which can read an image without discontinuity in the image even in high speed image reading.

It is still another object of the present invention to provide an image reading method and apparatus which can smoothly effect the interruption and the resumption of the reading before the completion of the reading of the document sheet image without adverse affect to the image.

The present invention provides an image reading method for photo-electrically reading a document sheet image by a reader by relatively moving the document sheet and the reader, comprising:

a first movement step for relatively moving the document sheet and the reader at a first speed to read an image of the document sheet;

a second movement step for relatively moving the document sheet and the reader at a second speed lower than the first speed for the interruption of the reading before the completion of the reading of the image of the document sheet; and a stop step for stopping the relative movement at the second speed of the document sheet and the reader. The present invention further provides an image reading apparatus comprising:

read means for photo-electrically reading an image of a document sheet;

move means for relatively moving said document sheet and said read means; and control means for controlling the relative movement by said move means;

said control means reducing a speed of the relative movement by said move means to a second speed lower than a first speed for steady reading upon the interruption of the reading before the completion of the reading of the image of the document sheet, and then stopping the relative movement by said move means.

The above and other objects and advantages of the present invention will be apparent from the following description.

BRIEF DESCRIPTION OF THE DRAWINGS

FIGS. 3A to 3E show time charts of read speeds in the embodiment.

DETAILED DESCRIPTION OF THE PREFERRED EMBODIMENTS

Figure 1:
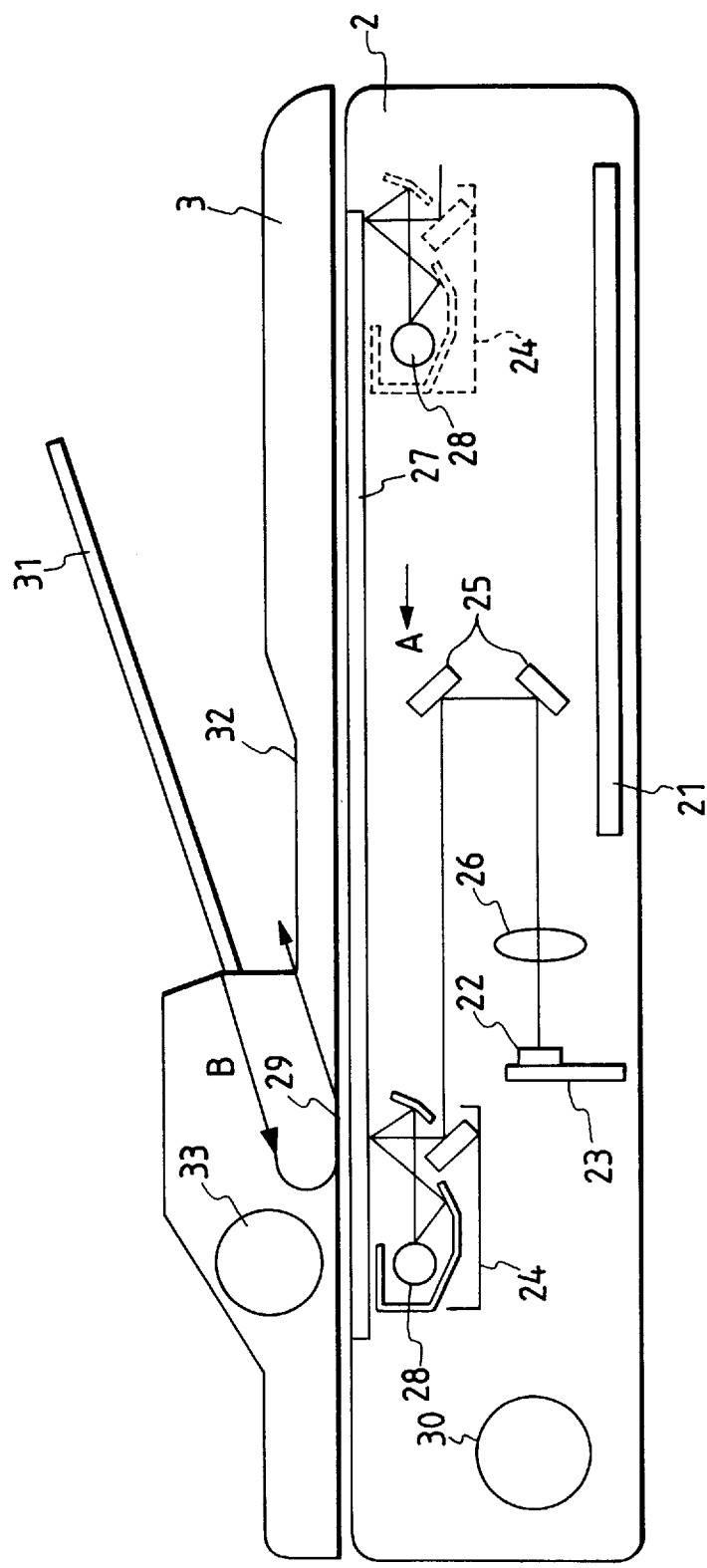
FIG. 1 shows an outer view of an image reading apparatus in accordance with the present invention.
Figure 2:
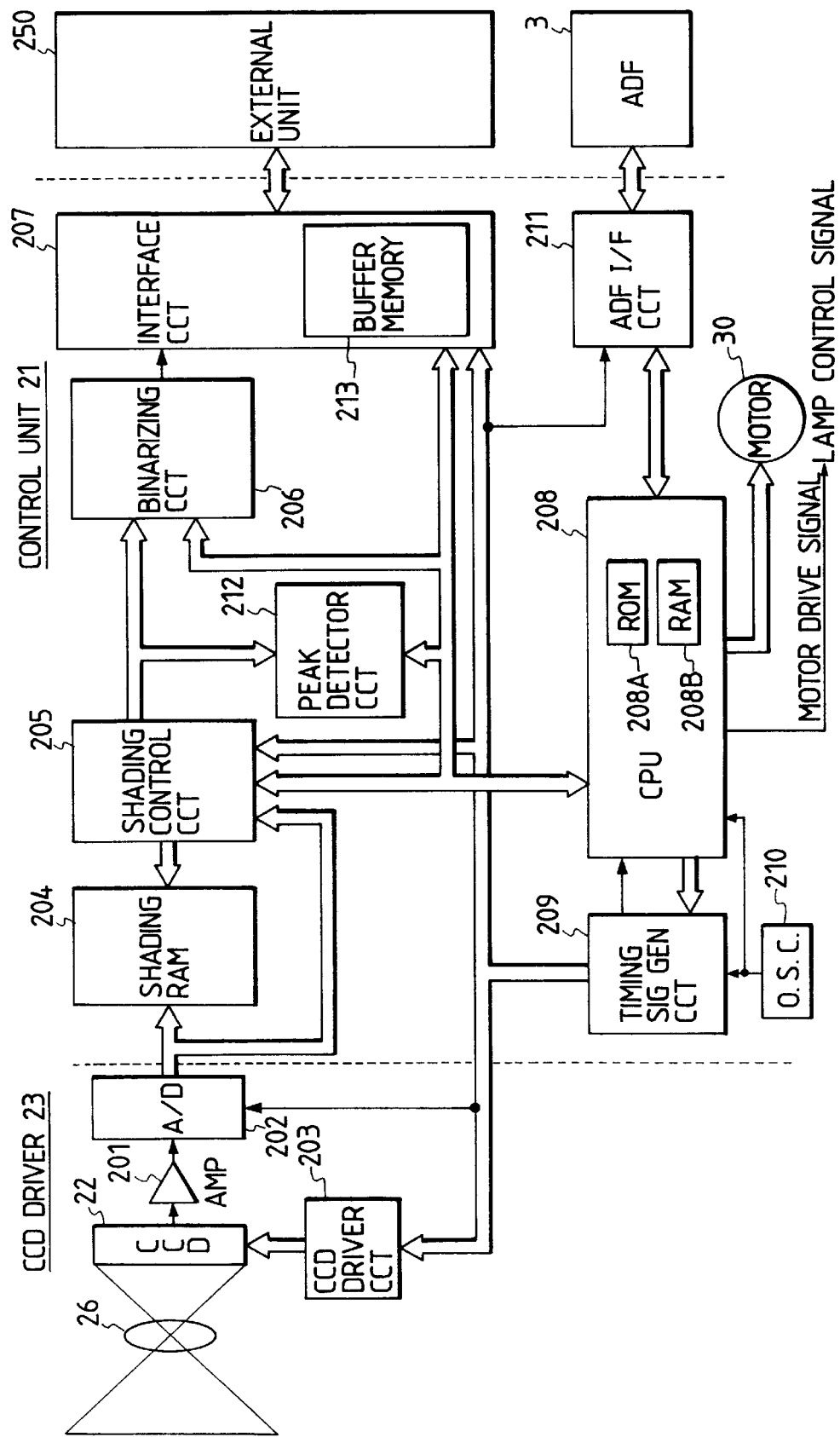
FIG. 2 shows a block diagram of an electrical configuration of the image reading apparatus in accordance with an embodiment of the present invention.

FIGS. 1 and 2 show an embodiment of the present invention.

FIG. 1 shows an internal construction of an image reading apparatus in accordance with the embodiment of the present invention. Numeral 2 denotes a main body of document sheet image reading apparatus. A document sheet on a platen glass 27 is illuminated by a lamp 28 on a document sheet illumination unit 24 and a reflected light is transmitted to a CCD 22 through a lens 26 via a mirror 25 to focus a document sheet image. Numeral 23 denotes a CCD driver and numeral 21 denotes a control unit. Numeral 3 denotes an automatic document sheet feeder (ADF unit) which is provided as required, and the document sheet on a document sheet table 31 is fed by a feed mechanism, not shown, in a direction B and ejected onto a document sheet ejection table 32 after the completion of the reading of the image. Numeral 30 denotes a stepping motor for driving an optical system such as the document sheet illumination unit 24, and numeral 33 denotes a stepping motor for feeding the document sheet of the ADF 3. In this manner, the document sheet and the optical system are relatively moved to photoelectrically read the document sheet image by the CCD 22.

FIG. 2 shows a block diagram of a circuit configuration of the CCD driver 23 and the control unit 21.

In FIG. 2, numeral 22 denotes a one-dimension read sensor, which, in the present embodiment, is a CCD linear image sensor (CCD) having a plurality of photo-sensing elements arranged in line. Numeral 201 denotes an amplifier for amplifying an output of the CCD 22 derived by photoelectrically reading the document sheet image, numeral 202 denotes an A/D converter for A/D converting the amplified output to produce an 8-bit digital output, and numeral 203 denotes a drive circuit for driving the CCD 22 as the read means in accordance with a timing signal supplied from the control unit 21 to control the read timing.

Numeral 207 denotes a parallel interface circuit which exchanges control signals with an external unit 250 which serves as a host unit of the image reading apparatus of the present embodiment such as a personal computer, and outputs the image signal. A buffer memory 213 for storing the image signal to time with the external unit 250 is provided in the parallel interface circuit 207. Numeral 211 denotes an ADF interface circuit which is used for the communication to control the ADF 3 when the ADF 3 is used. Numeral 208 denotes a CPU which may be in the form of microcomputer and has a ROM 208A (which is backed up by a power supply, not shown) for storing a process procedure and a RAM 208B for working. A pulse for driving the stepping motor is generated and the turn-on of the lamps is controlled in accordance with the procedure stored in the ROM 208A.

The CPU 208 determines whether the transfer of the document sheet image information to the external unit 250 is ready or not during the transfer of the document sheet image to the external unit 250. The CPU 208, a binary circuit 206 and the interface circuit 207 form a transfer mechanism for transferring the document sheet image read by the CCD 22 and the status of the main body determined by the CPU 208 to the external unit 250. The CPU 208 detects a vacant capacity of the buffer memory 213 to effect a slow-down control to be described later.

A shading RAM 204 stores a light distribution characteristic of the illumination lamp 28. A shading control circuit 205 comprises a shading ROM which stores a shading correction coefficient and a circuit for controlling a shading RAM 204, and it applies the shading correction to the image signal supplied from the A/D converter 202 based on the light distribution characteristic of the illumination lamp 28 stored in the shading RAM 204 and outputs the corrected image signal to the binary circuit 206. A binary image signal from the binary circuit 206 is outputted to the external unit 250 through the buffer memory 213 of the parallel interface circuit 207.

Numeral 210 denotes an oscillator such as a crystal OSC. Numeral 209 denotes a timing signal generator for generating various timing signals which are bases of the operation by frequency-dividing an output of the oscillator 210 in accordance with the setting of the CPU 208. Numeral 212 denotes a peak detector for detecting a white peak of the image signal.

Referring to FIGS. 1 and 2, an operation of the document sheet reading apparatus is explained. The present document sheet reading apparatus has two modes, a sheet mode for reading an image while a plain paper document sheet having no binding area is fed over the document sheet illumination position 29 by using the automatic document sheet feed unit (ADF unit) 3, and a book mode for reading the image by scanning the optical system comprising the document sheet illumination unit 24 and the mirror 25 while the book-like document sheet having a binding area like a book is mounted on the platen glass 27.

The sheet mode is first explained. The present image reading apparatus (hereinafter referred to as a reader) is connected to the external unit 250 (such as a personal computer) and the communication of the control signal to the external unit 250 and the output of the image signal to the external unit 250 are effected through the parallel interface circuit 270.

The modes (resolution, document sheet size, magnification, etc.) are commanded to the external unit 250 while the document sheet is placed on the document sheet table 31 of the ADF 3. When the CPU 208 receives them, it sets control signals corresponding to the read modes to the timing signal generator 209 and the binary circuit 206. It also checks whether the document sheet illumination unit 24 of the optical system is at the document sheet read position (shown by a solid line in FIG. 1) in the sheet mode which uses the ADF 3, by using an optical position sensor (not shown). If the document sheet illumination unit 24 is not at the ADF document sheet reading position, the document sheet illumination unit 24 is moved to the ADF document sheet read position before the read operation is started by the next document sheet read command.

When a read start command is issued from the external unit 250 under this condition, the CPU 208 outputs a lamp control signal to turn on the lamp 28 and outputs a document sheet feed start command to the ADF 3 through the ADF interface circuit 211. Thus, the document sheet placed on the document sheet table 31 of the ADF 3 is fed in the direction B in FIG. 1 as the stepping motor 33 of the ADF 3 is driven.

Since the present reader uses the stepping motors 33 and 30 as the motors to feed the document sheet by the ADF and drive the optical system, the speeds of the document sheet feed and the optical system scan can be changed by changing the frequencies of the pulses for driving the motors supplied from the CPU 208.

In the sheet mode, whether the leading edge of the document sheet fed by the ADF 3 has reached the document sheet illumination position 29 of the reader or not can be detected by a document sheet leading edge sensor (not shown) arranged in the ADF 3 as is well known in the art. When the document sheet reaches the document sheet illumination position, the CPU 208 outputs a control signal for permitting the output of the image signal to the external unit 250 through the parallel interface circuit 207, and the read image signal is sequentially sent to the external unit 250 through the parallel interface circuit 207. When the trailing edge of the document sheet has passed through the document sheet illumination position 29 (as detected by a document sheet trailing edge sensor, not shown), the CPU 208 applies a control signal to inhibit the output of the image signal to the parallel interface circuit 207 and stops the output of the image signal to the parallel interface circuit 207 and outputs a document sheet read end signal to the external unit 250. Then, the CPU 208 turns off the lamp 28 and terminates the operation.

The book mode is now explained. In the book mode, the document sheet is placed on the platen glass 27. An initial position of the illumination unit 24 of the optical system in the book mode is at a right end as shown by a broken line in FIG. 1, and the position is confirmed by the optical position sensor (not shown) as it is done in the sheet mode. The setting of the read mode before the start of the reading of the document sheet is identical to that in the sheet mode.

When the document sheet read start command is issued from the external unit 250, the CPU 208 outputs the lamp control signal to turn on the lamp 28. After waiting for approximately 600 msec until the light intensity of the lamp 28 is stabilized, the stepping motor 30 is driven to move the optical system in the direction A of FIG. 1 to start the scanning, and the CPU 208 outputs the control signal to permit the output of the image signal to the parallel interface circuit 207. Thus, the read image signal is sequentially sent to the external unit 250. After the predetermined number of read data preset by the external unit 250 have been transferred, the CPU 208 output the lamp control signal to turn off the lamp 28 and reverses the document sheet illumination unit 24, and when it detects by the optical position sensor that the illumination unit 24 has reached the initial position, it terminates the operation.

Referring now to time charts of FIGS. 3A to 3E, the reading methods in the steady state reading in the present embodiment and the slow-down reading state in the start-stop sequence are explained. In the present embodiment, the slow-down reading is effected at a ½ (N =2) speed of that in the steady state reading. The slow-down reading may be effected at a plurality of speeds to attain more stable and finer slow-down control.

As described above, the feed system is driven by the stepping motors 30 and 33, and two reading speeds, 1.17 lines/msec and 0.585 (=1.17/2) lines/msec may be set. For each reading speed, four pulses are prepared as the pulses required to feed the document sheet or drive the optical system by one-line distance along a sub-scan direction. The speeds may be appropriately selected in accordance with the construction of the apparatus and the capacities of the stepping motors and need not be limited to the above specific speeds.

HSYNC of FIG. 3A is a synchronization signal for each line of the CCD image sensor (CCD 22) and it has a period of 0.855 msec. The period of the HSYNC corresponds to a storage period of the CCD 22. PMCK1 of FIG. 3B is a clock pulse for driving the stepping motor in the steady state reading. It is assumed that an excitation pattern changes at a rise of the pulse, and the stepping motor is driven at 4678 pps (pulses per second) since four pulses are supplied in one storage period of the CCD 22, or 0.855 msec. FIG. 3C shows a CCD output in the steady state reading at 4 pulses/line and the number indicates the line number of the line stored in the CCD 22. Namely, it indicates the number of lines actually read when the slow-down is not effected. PMCK2 of FIG. 3D shows a clock pulse for driving the stepping motor in the slow-down reading state. The stepping motor is driven at 2339 pps since two pulses are supplied in 0.855 msec. FIG. 3E shows the number of lines actually read by the CCD 2 in the slow-down reading state.

In the steady state reading, the CCD output of FIG. 3C is outputted for each HSYNC of FIG. 3A while in the slow-down reading state, the CCD output is outputted not for each HSYNC but at every second HSYNC as shown in FIG. 3E. In the slow-down reading state, the period of HSYNC corresponds to the storage period of the CCD 22.

In this manner, in the steady state reading and the slow-down reading, the storage period of the CCD is not changed but the scan speed is changed.

Figure 4:
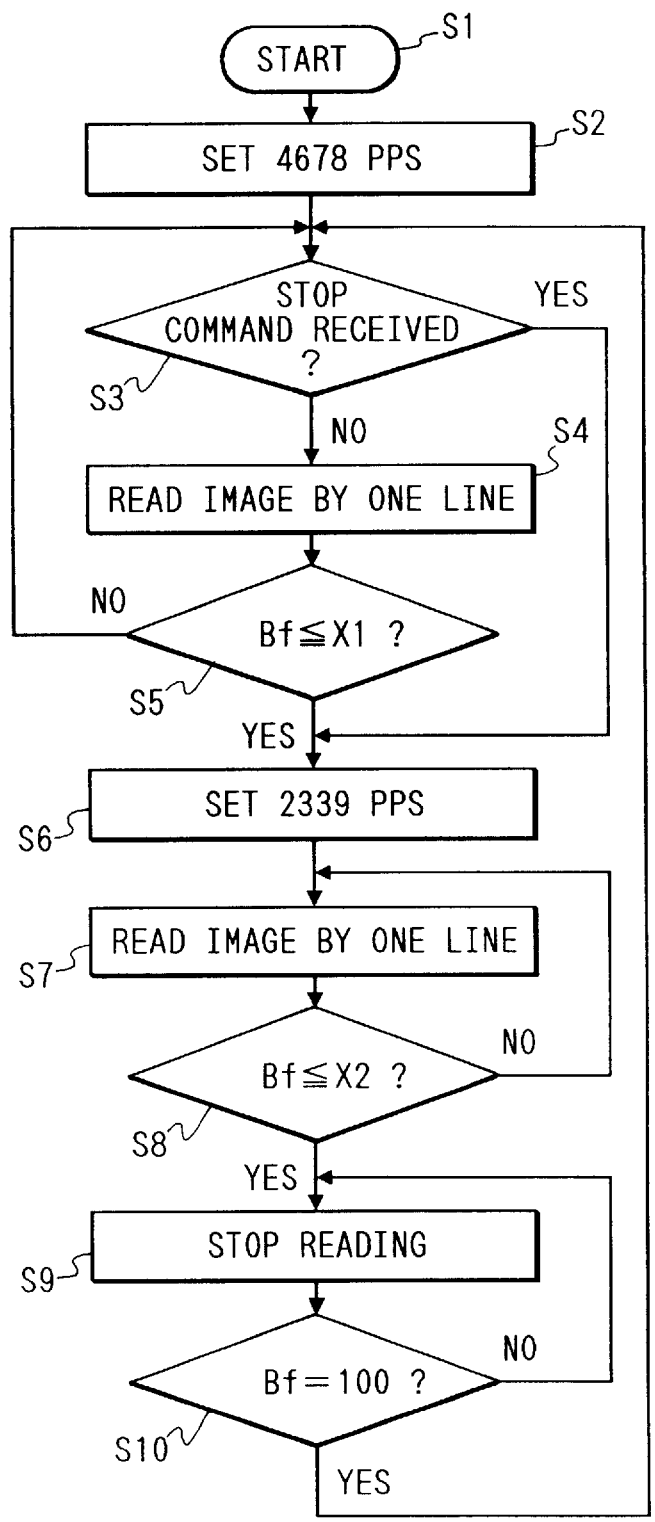
FIG. 4 shows a flow chart of a process of a first embodiment of the present invention.

FIG. 4 shows a flow chart of a control procedure by the CPU 208.

Referring to the flow chart of FIG. 4, the control procedure of the CPU 208 in the slow-down sequence is explained. Before the explanation of the procedure, means for detecting by the CPU 208 whether the ADF 3 is loaded in the main body or not is explained. Namely, a CPU (not shown) separate from the CPU 208 is mounted on the ADF 3 and the separate CPU inform to the CPU 208 via the ADF interface circuit 211 the number of pulses required to feed the document sheet by one line length. (Normally, it is 4 pulses/line but it may be changed by the model change of the ADF.) Thus, when the CPU 208 receives the notice of the number of pulses from the ADF 3, it recognizes that the ADF has been loaded, and if it does not receive the notice, it determines that the ADF 3 is not loaded.

The image signal is outputted to the external unit 250 through the buffer memory 213 in the interface circuit 207, and the CPU 208 sequentially detects the vacant capacity of the buffer memory 213. It writes a ratio of the vacant capacity to the whole capacity in an area Bf of the RAM 208B.

The slow-down sequence is now explained.

When the CPU 208 of FIG. 2 receives a read command from the external unit 250 through the parallel interface circuit 207 in a step S1, it sets a drive frequency of the stepping motor to 4678 pps for the steady state reading in a step S2. When it receives a stop signal from the external unit 250 in a step S3, it proceeds to a step S6 to effect the slow-down control as will be explained later. Otherwise, it proceeds to a step S4. In the step S4, it feeds the document sheet or drive the optical system by one line length at the preset read speed (4678 pps) to read one line of image.

In a step S5, if the content of the area Bf of the RAM 208B (the percent ratio of the vacant capacity to the whole capacity of the buffer memory 213) is larger than X1 (a preset value between 0 and 100, for example 30%), it determines that the image signal is ready to be transmitted and proceeds to the step S3 to continue the line reading. Otherwise, it determines that the buffer memory 213 may overflow and the transmission rate of the image signal should be reduced, and proceeds to the step S6 to effect the slow-down.

In the step S6, the drive frequency of the stepping motor is set to 2339 pps for the slow-down and it proceeds to a step S7 and feeds the document sheet or drives the optical system by one line length at the preset read speed (2339 pps) to read one line of image. Then, it proceeds to a step S8, and if the content of the area Bf of the RAM 208B is larger than X2 (100>X1>X2>0, for example 5%), it proceeds to the step S7 to continue the reading by the slow-down mode. Otherwise, it determines that there is a high possibility of the overflow of the buffer memory 213 and further reading is not possible, and in a step S9, it interrupts the feeding of the document sheet or the driving of the optical system to stop the reading.

It stops the reading in the step S9 until the content of Bf reaches 100 (the buffer memory 213 is totally vacant), and when the content of Bf reaches 100 (the buffer memory 218 is totally vacant) in a step S10, it proceeds to the step S3 to resume the reading in the slow-down mode.

In the present embodiment, the stepping motor is driven at two speeds by using two pulse frequencies, 4768 pps and 2339 pps at two speeds although the present invention is not limited thereto. For example, N may be set to 3 to set three read speeds, 1 time, ⅔ time and ⅓ time of the steady read speed and one of the speed may be selected in accordance with the buffer memory capacity so that the slow-down control is more finely effected and the faster reading is attained.

While the document sheet feed and the optical system drive are effected by the stepping motors in the present embodiment, it should not be limited to the stepping motor but other motors which can effect the document sheet feed or the optical system drive at 1/N time (where N is an integer no smaller than 2) of a steady read speed as described above to conduct the slow-down control.

The optical system driven in the book mode includes the lamp and the mirror of the optical unit in the present embodiment. When the image sensor itself is driven relative to the document sheet in a construction which uses the image sensor permitting a unity magnification reading, the image sensor and the peripheral elements thereof may be the subject of the slow-down control.

In the present embodiment, the reader which is operable in the sheet mode as well as in the book mode is used. Alternatively, the slow-down control may be applied to a reader having one of the two modes.

As described above, when the movement is to be stopped from the steady read speed, the relative movement of the document sheet and the reader at the speed of 1/N (where N is an integer no smaller than 2) time of the steady reading speed and the vacant capacity of the buffer memory for outputting the image signal is monitored to conduct the slow-down sequence. Accordingly, the start-stop reading with the normal image quality is attained in the high speed scanner.

In accordance with the first embodiment of the present invention, at the interruption of the reading before the completion of the reading of the document sheet image, the relative movement speed of the document sheet and the reader is reduced to 1/N (where N is an integer no smaller than 2) time of the steady reading speed and then the relative movement is stopped. Accordingly, the relative movement of the document sheet and the reader for the interruption of the reading can be smoothly conducted, and the drop or the overlapping of the reading at the interruption position of the reading is avoided and high quality image reading is attained.

[Second Embodiment]

In the first embodiment described above, when the reading of the document sheet is interrupted after the reading in the slow-down mode, the subsequent reading of the document sheet is resumed in the slow-down mode. Where the reading is resumed in the slow-down mode, the feeding of the document sheet or the drive of the optical system is started at a low speed and the vibration of the document sheet or the optical system by the inertia is small and the affect to the reading of the image is small. Further, the need for the reexecution of the switching from the steady read mode to the slow-down mode after the resumption of the image reading is eliminated.

However, in a system in which no adverse affect is brought by the steady read mode in the resumption of the reading of the image, or where a remaining image to be read at the interruption of the reading of the image and the buffer memory does not overflow even if the reading at the steady mode reading is effected, it is more efficient to resume the reading of the image in the steady mode.

Thus, in the second embodiment, in resuming after the interruption of the reading of the image, the reading of the image in the steady read mode is effected.

Figure 5:
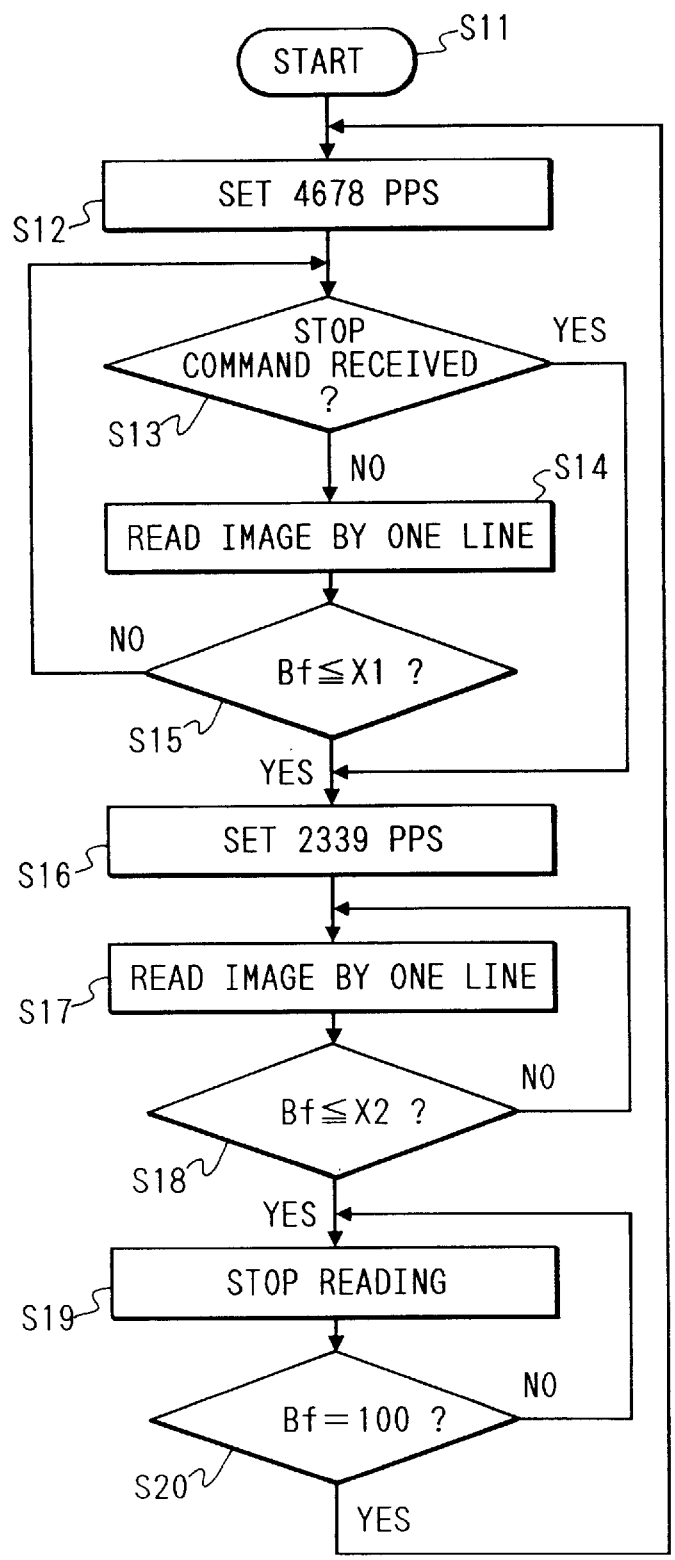
FIG. 5 shows a flow chart of a process of a second embodiment of the present invention.

FIG. 5 shows a flow chart of a control procedure by a CPU 208 to implement the second embodiment.

The configuration of the image reader is common to that shown in FIGS. 1 and 2 except a program for the slow-down sequence stored in the ROM 208A of the CPU 208.

The slow-down sequence of the second embodiment is explained below.

When the CPU 208 of the reader main body of FIG. 2 receives a read command from the external unit 250 through the parallel interface circuit 207, in a step S11, it sets the drive frequency of the stepping motor to 4678 pps for the steady reading in a step S12. When it receives a stop signal from the external unit 250 in a step S13, it proceeds to a step S16 to conduct the slow-down control as will be described later. Otherwise, it proceeds to a step S14. In the step S14, the document sheet is fed or the optical system is driven by one-line distance at the preset reading speed (4678 pps) to read one line of image.

In a step S15, if the content of the area Bf of the RAM 208B (the percent ratio of the vacant capacity to the total capacity of the buffer memory 213) is larger than X1 (between 0 and 100), it determines that the image signal is ready to be sent and proceeds to a step S13 to continue further line reading. Otherwise, it determines that the buffer memory 213 may overflow and the amount of image signal to be transmitted is to be reduced, and proceeds to the step S16 for the slow-down.

In the step S16, it sets the drive frequency of the stepping motor to 2339 pps for the slow-down and proceeds to a step S17 to feed the document sheet or drive the optical system by one-line distance at the preset read speed (2339 pps) to read one line of image. Then, it proceeds to a step S18, and if the content of the area Bf is larger than X2 ($188>X1>X2>0$), it proceeds to a step S17 to continue the reading in the slow-down mode. Otherwise, it determines that there is a high possibility that the buffer memory 213 overflows and the further reading is not permitted, and stops the reading in a step S19.

The reading is stopped in the step S19 until the content of the area Bf reaches 100 (the buffer memory is totally vacant), and when the content of the Bf reaches 100 (the buffer memory is totally vacant) in a step S20, it proceeds to a step S12 to set the drive frequency to 4678 pps for the steady reading to resume the reading in the steady read mode.

In the first and second embodiments described above, when the reading is interrupted after the reading of the image in the slow-down mode, the reading of the image is resumed in one of the slow-down mode and the steady read mode. However, if the mode to resume the reading can be selected by the reading mode of the image, the remaining amount of image to be read and the processing speed of the external unit, the efficiency of the reading of the image will be improved.

Accordingly, more efficient reading of the image can be attained by permitting the operator to select one of the modes by providing a system which allows the resumption of the reading of the image in any one of the modes.

[Third Embodiment]

As described above, it is desirable that whether the reading of the image is to be resumed in the steady read mode or the slow-down mode is selected by various factors.

In a third embodiment, the mode at the resumption of the reading of the image is selected by the image reader in accordance with the reading of image to be executed.

Figure 6:
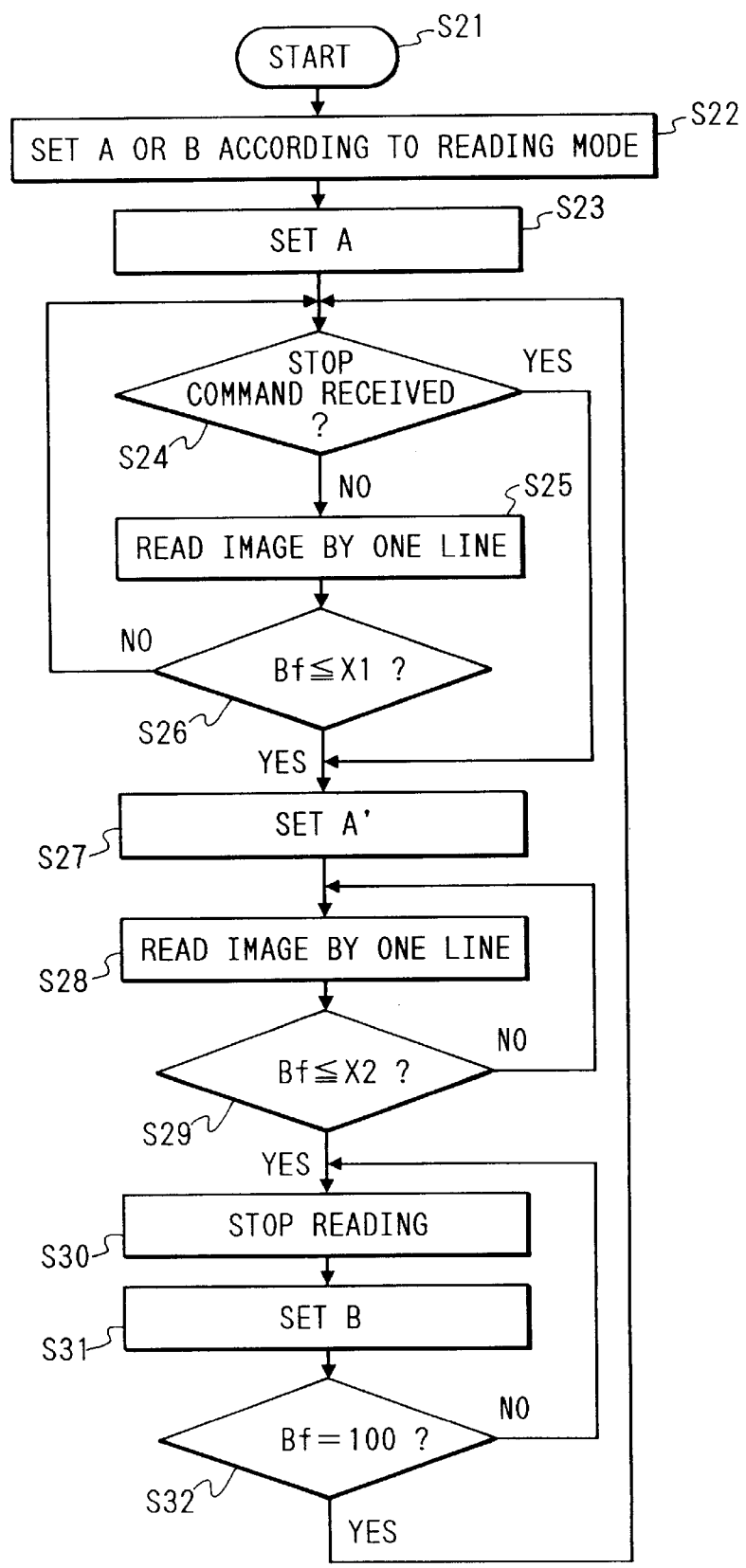
FIG. 6 shows a flow chart of a process of a third embodiment of the present invention.

FIG. 6 shows a flow chart of a control procedure by the CPU 208 to implement the third embodiment.

The configuration of the image reader is common to that shown in FIGS. 1 and 2 except a program for the slow-down sequence stored in the ROM 208A of the CPU 208.

The slow-down sequence of the third embodiment is explained below. In FIG. 6, A denotes a pulse frequency (4678 pps) in the steady read mode, A' denotes a pulse frequency (2339 pps) in the slow-down mode and B denotes a pulse frequency (4678 pps or 2339 pps) at the resumption of the reading.

Prior to the start of the reading of the image, various modes (resolution, document sheet size and magnification) are inputted to the CPU 208 of the main body of FIG. 2 from the external unit 250.

When the CPU 208 of the reader main body of FIG. 2 receives a read command from the external unit 250 through the parallel interface circuit 207 in a step S21, it selects and sets one of A (4678 pps) and B (2339 pps) as the pulse frequency for resuming the reading of the image in accordance with the modes for reading the image in a step S22. In a step S23, it sets the drive frequency of the stepping motor to A (4678 pps for the steady reading). When it receives a stop signal from the external unit 250 in a step S24, it proceeds to a step S27 to conduct the slow-down control as will be described later. Otherwise, it proceeds to a step S25. In the step S24, the document sheet is fed or the optical system is driven by one-line distance at the preset read speed A (=4678 pps) to read one line of image.

In a step S26, if the content of the area Bf of the RAM 208B (the percent ratio of the vacant capacity to the total capacity of the buffer memory 213) is larger than X1 (0<X1<100), it determines that the image signal is ready to be sent and proceeds to the step S24 to continue the further line reading. Otherwise, it determines that the buffer memory 213 may overflow and the amount of transmission of the image signal is to be reduced, and proceeds to a step S27 for the slow-down.

In the step S27, the drive frequency of the stepping motor is set to A' (2339 pps for the slow-down) and proceeds to a step S28 to feed the document sheet or drive the optical system by one-line distance at the preset read speed A' (=2339 pps) to read one line of image. Then, it proceeds to a step S29, and if the content of the area Bf is larger than X2 (100>X1>X2>0), it proceeds to the step S28 to continue the reading in the slow-down mode. Otherwise, it determines that there is a high possibility that the buffer memory 213 overflows and the further reading is not permitted, and stops the reading in a step S30. In a step S31, the drive frequency B of the stepping motor for resuming the reading which was set in the step S22 is set.

The reading is stopped in the step S30 until the content of the Bf reaches 100 (the buffer memory 213 is totally vacant), and when the content of the Bf reaches 100 (the buffer memory 213 is totally vacant) in a step S32, the process proceeds to the step S24 to resume the reading in the steady read mode or the slow-down read mode.

In the present embodiment, the stepping motor is driven at the resumption of the reading at one of the two pulse frequencies, 4678 pps and 2339 pps although the present invention is not limited thereto, and one or more drive frequencies for reading may be provided in addition to the drive frequencies in the steady read mode and the slow-down read mode and one of them may be appropriately selected.

[Fourth Embodiment]

In the third embodiment described above, the drive frequency B of the stepping motor at the resumption of the reading of the image is selected by the image reader.

In the fourth embodiment, the external unit 250 which receives the image signal calculates a drive frequency B' for the resumption of the reading based on the processing speed of its own unit and the image read mode, and transmits it to the image reader for setting.

Figure 7:
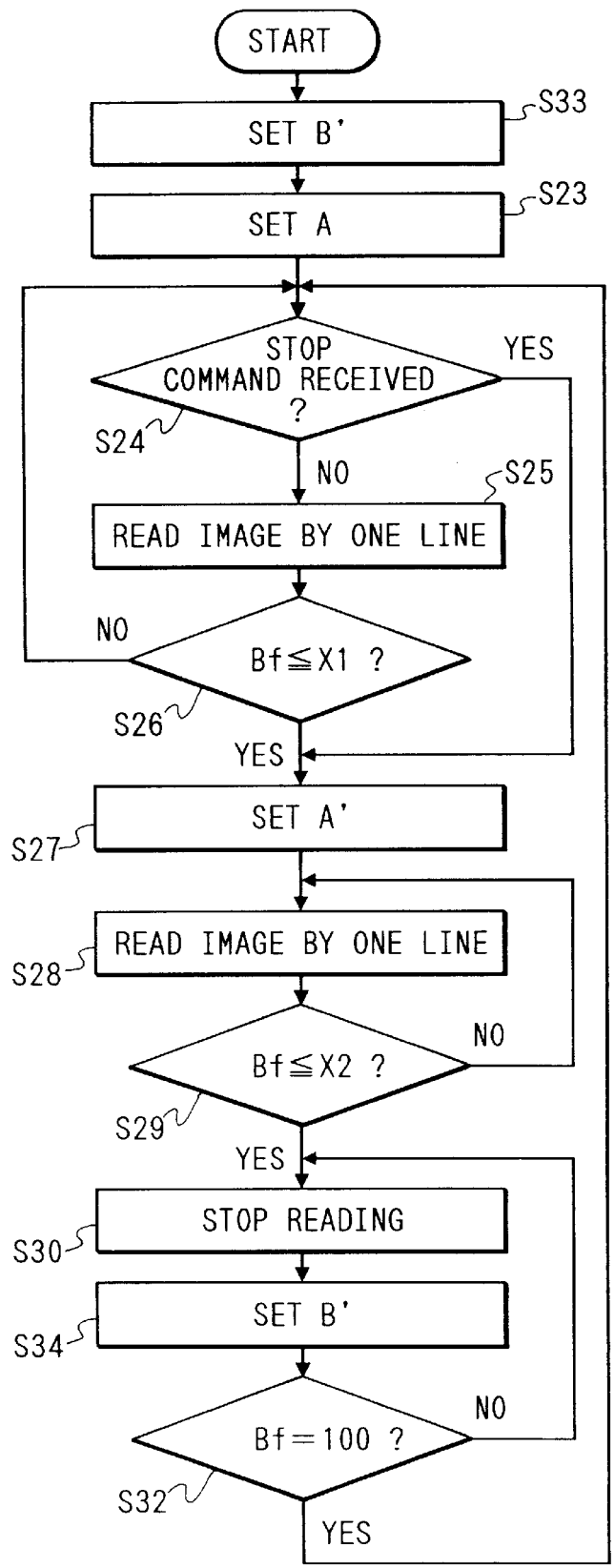
FIG. 7 shows a flow chart of a process of a fourth embodiment of the present invention.

FIG. 7 shows a flow chart of a control procedure of the fourth embodiment. A configuration of the image reader is common to that shown in FIGS. 1 and 2 except a program for the slow-down sequence stored in the ROM 208A of the CPU 208.

In the flow chart of FIG. 7, the steps S22 and S31 in the flow chart of FIG. 6 are changed to steps S33 and S44 and other steps are identical to those of FIG. 6.

Thus, only the steps S33 and S34 are explained.

In the step S33, the CPU 208 receives the drive frequency B' determined by the external unit 250 based on the processing speed and the image read mode from the external unit 250 and sets it as the drive frequency of the stepping motor for resuming the reading of the image.

In the step S34, it sets the drive frequency B' for resuming the reading of the image following to the interruption of the reading of the image in the step S30.

In this manner, the reading of the image is resumed by using the drive frequency B' determined by the external unit 250.

[Fifth Embodiment]

In the third and fourth embodiments described above, prior to the reading of the image, the drive frequency of the stepping motor for resuming the reading is set based on the image read mode and/or the image processing speed.

In the fifth embodiment, the drive frequency for resuming the reading is set at the interruption of the reading of the image.

In the fifth embodiment, the drive frequency for resuming the reading is set by taking the state in which the reading of the image was interrupted into account.

Figure 8:
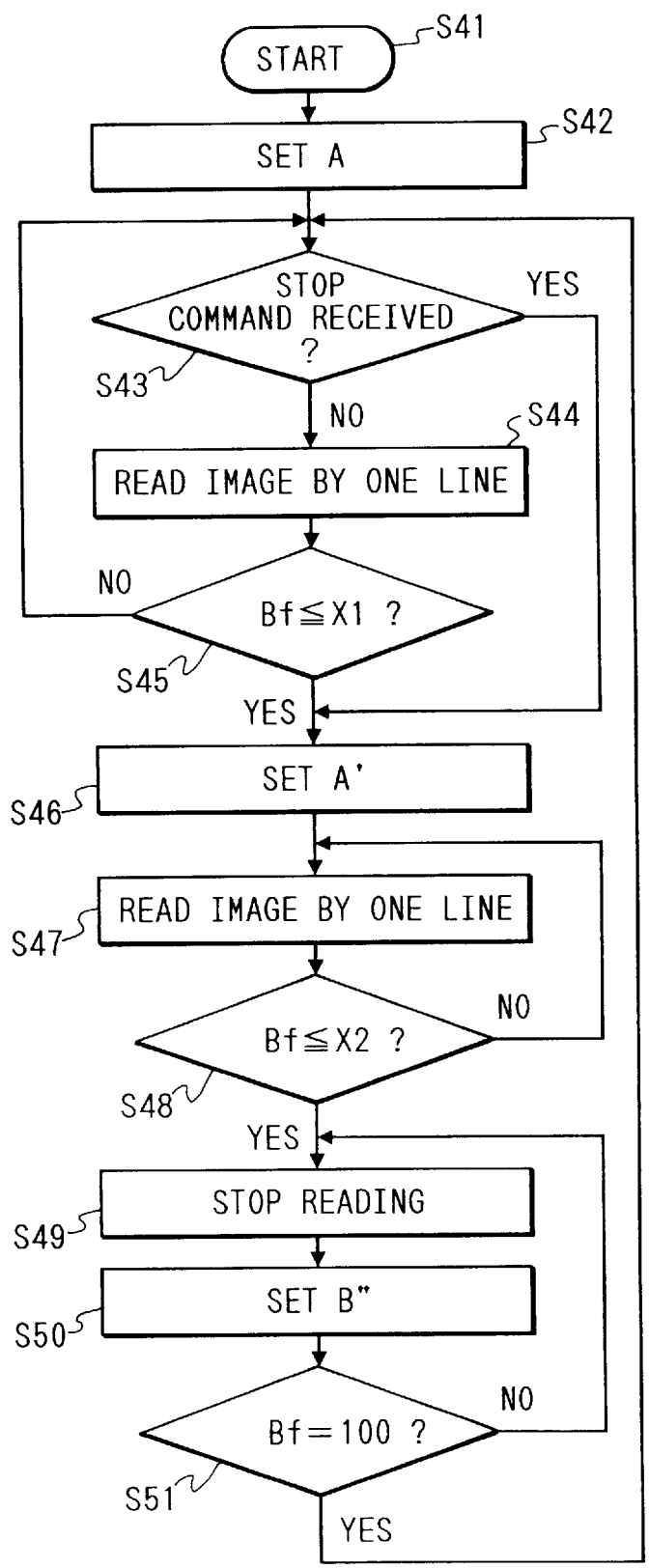
FIG. 8 shows a flow chart of a process of a fifth embodiment of the present invention.

FIG. 8 shows a flow chart of a control procedure of the fifth embodiment. A configuration of the image reader is common to that shown in FIGS. 1 and 2 as it is for the second to fourth embodiments.

The slow-down sequence of the fifth embodiment is now explained.

When the CPU 208 of the reader main body of FIG. 2 receives a read command from the external unit 250 through the parallel interface 207 in a step S41, it sets the drive frequency of the stepping motor to A (4678 pps for the steady reading) in a step S42. When it receives a stop signal from the external unit 250 in a step S43, it proceeds to a step S46 to conduct the slow-down control as will be described later. Otherwise, it proceeds to a step S44. In the step S44, it feeds the document sheet or drives the optical system by one-line distance at the preset speed A (=4678 pps) to read one line of image.

In a step S45, if the content of the area Bf of the RAM 208B (the percent ratio of the vacant capacity to the total capacity of the buffer memory 213) is larger than X1 (between 0 and 100), it determines that the image signal is ready to be sent and proceeds to a step S43 to continue the further line reading. Otherwise, it determines that the buffer memory 213 may overflow and the amount of transmission of the image signal is to be reduced, and proceeds to a step S46 for the slow-down.

In the step S46, it sets the drive frequency of the stepping motor to A' (2339 pps for the slow-down) and proceeds to a step S47 to feed the document sheet or drive the optical system by one-line length at the preset read speed A' (=2339 pps) to read one line of image. Then, it proceeds to a step S48, and if the content of the area Bf is larger than X2 (100>X1>X2>0), it proceeds to S47 to continue the reading in the slow-down mode. Otherwise, it determines that there is a high possibility that the buffer memory 213 overflows and the further reading is not permitted, and stops the reading in a step S49.

In a step S50, it determines and sets a drive frequency B" of the stepping motor for resuming the reading based on the image read mode and the number of lines already read (or the number of remaining lines). Namely, if the number of lines already read is small, it determines that there is a possibility that the buffer memory 213 overflows again after the resumption of the reading and resumes the reading of the image in the slow-down mode (2339 pps). On the other hand, if the number of lines already read is large (the number of remaining lines is small), it determines that a possibility of the occurrence of the overflow of the buffer memory 213 is low and resumes the reading in the steady read mode (4678 pps).

The reading is stopped in the step S49 until the content of the Bf reached 100 (the buffer memory is totally vacant), and when the content of the Bf reaches 100 (the buffer 213 is totally vacant) in a step S51, it proceeds to a step S43 to resume the reading in the slow-down mode or the steady read mode.

In the present embodiment, the stepping motor is driven at the resumption of the reading at one of the two pulse frequencies, 4678 pps and 2339 pps although the present invention is not limited thereto. For example, other drive frequency may be set as the frequency for resuming the reading in accordance with the status at the interruption of the reading of the image.

In accordance with the fifth embodiment, since the drive frequency of the stepping motor for resuming the reading is set at the interruption of the reading of the image, the reading of the image may be resumed in a high efficiency mode suitable for the operation of reading of the image under execution.

In accordance with the second to fifth embodiments, at the interruption of the reading before the completion of the reading of the document sheet image, the relative movement speed of the document sheet and the reader is reduced to 1/N (where N is an integer no smaller than 2) time of the steady read speed and then the relative movement is stopped, and the reading in resumed in the mode appropriate to the read operation of the image. Accordingly, the relative movement of the document sheet and the reader may be stopped smoothly for the interruption of the reading and high quality image reading without drop or overlap of reading at the interruption position of the reading is attained and the resumption of the reading of the image after the interruption may be conduced in an efficient manner.

In the above embodiments, the stepping motor is driven at one of two pulse frequencies, 4678 pps and 2339 pps, although the present invention is not limited thereto and more frequencies, for example, N=3 may be used to set three reading speeds, 1 time, ⅔ time and ⅓ time of the steady read speed, and one of them may be selected in accordance with the buffer memory capacity so that the slow-down control is more finely conducted and faster reading is attained.

While the document sheet is fed and the optical system is driven by the stepping motors in the embodiments, other motors than the stepping motors which can feed the document sheet or drive the optical system at 1/N (where N is an integer no smaller than 2) time of the steady speed may be used to conduct the slow-down control.

The optical system moved in the book mode includes the lamp and the mirror of the optical unit in the embodiments. When the image sensor itself is moved relative to the document sheet in a system using the image sensor which permits the unity magnification reading, the image sensor and the peripheral elements thereof may be the subject of the slow-down control.

While the reader which is operable in the sheet mode as well as the book mode is used in the embodiments, the slow-down control may be applied to a reader having one of the modes.

While the present invention has been shown and described in conjunction with the preferred embodiments, it should be understood that the present invention is not limited to those embodiments but various changes and modifications may be made without departing from the scope of the claims.

What is claimed is:

1. An image reading method for electrically reading an image of a document sheet by a reader by relatively moving the document sheet and the reader and outputting the image signal to an external unit through a memory, comprising the steps of:

relatively moving the document sheet and the reader at a first speed to read the image of the document sheet when a vacant capacity of the memory is no smaller than a first capacity;

relatively moving the document sheet and the reader at a second speed lower than the first speed to read the image of the document sheet when the vacant capacity of the memory is smaller than the first capacity;

stopping the relatively movement at the second speed of the document sheet and the reader to interrupt the reading of the image of the document sheet when the vacant capacity of the memory is smaller than a second capacity smaller than the first capacity;

relatively moving the document sheet and the reader at a third speed to resume the reading of the image of the document sheet when the vacant capacity of the memory becomes a third capacity, with the third speed being determined in accordance with an image reading condition;

setting the second speed in accordance with the image read condition; and setting the third speed in accordance with a number of lines already read or the number of remaining lines.

2. An image reading method according to claim 1, wherein said setting step sets the third speed at the time of interruption of the reading of the image of the document sheet.

3. An image reading method according to claim 1, wherein said setting step sets one of the first speed and the second speed as the third speed.

4. An image reading apparatus, comprising:

read means for photo-electrically reading an image of a document sheet and generating an image signal;

move means for relatively moving the document sheet and said read means;

memory means for storing the image signal from said read means and outputting the image signal to an external unit; and control means for controlling the relative movement by said move means;

said control means causing the relative movement by said move means at a first speed to read the image of the document sheet when a vacant capacity of the memory is no smaller than a first capacity, reducing the speed of the relative movement by said move means from the first speed to a second speed lower than the first speed when the vacant capacity of the memory is smaller than the first capacity, stopping the relative movement by said move means to interrupt the reading of the image of the document sheet when the vacant capacity of the memory is smaller than a second capacity smaller than the first capacity, and resuming the relative movement by said move means at a third speed to resume the reading of the image of the document sheet when the vacant capacity of the memory becomes a third capacity, with the third speed being determined in accordance with an image reading condition, wherein said control means also sets the third speed in accordance with a number of lines already read or the number of remaining lines.

5. An image reading apparatus according to claim 4, wherein said control means sets the third speed at the time of interruption of the reading of the image of the document sheet.

6. An image reading apparatus according to claim 4, wherein said move means includes a stepping motor and said control means controls a frequency of a pulse for driving said stepping motor.

7. An image reading apparatus according to claim 4, wherein said control means set one of the first speed and the second speed as the third speed.

8. An image reading apparatus comprising:

read means for photo-electrically reading an image of a document sheet and generating an image signal;

move means for relatively moving the document sheet and said read means;

memory means for storing the image signal from said read means and outputting the image signal to an external unit; and control means for controlling the relative movement by said move means;

said control means causing the relative movement by said move means at a first speed to read the image of the document sheet when a vacant capacity of the memory is no smaller than a first capacity, reducing the speed of the relative movement by said move means from the first speed to a second speed lower than the first speed when the vacant capacity of the memory is smaller than the first capacity, stopping the relative movement by said move means to interrupt the reading of the image of the document sheet when the vacant capacity of the memory is smaller than a second capacity smaller than the first capacity, and resuming the relative movement by said move means at a third speed to resume the reading of the image of the document sheet when the vacant capacity of the memory becomes a third capacity, with the third speed being determined in accordance with an image reading condition, wherein said control means also sets the third speed based on data received from the external unit.

9. An image reading apparatus according to claim 8, wherein said control means sets the third speed before the start of the reading of the image of the document sheet.

10. An image reading apparatus according to claim 8, wherein said move means includes a stepping motor and said control means controls a frequency of a pulse for driving sid stepping motor.

11. An image reading apparatus according to claim 8, wherein said control means set one of the first speed and the second speed as the third speed.

12. An image reading method for electrically reading an image of a document sheet by a reader by relatively moving the document sheet and the reader and outputting the image signal to an external unit through a memory, comprising the steps of:

relatively moving the document sheet and the reader at a first speed to read the image of the document sheet when a vacant capacity of the memory is no smaller than a first capacity;

relatively moving the document sheet and the reader at a second speed lower than the first speed to read the image of the document sheet when the vacant capacity of the memory is smaller than the first capacity;

stopping the relatively movement at the second speed of the document sheet and the reader to interrupt the reading of the image of the document sheet when the vacant capacity of the memory is smaller than a second capacity smaller than the first capacity; and relatively moving the document sheet and the reader at a third speed to resume the reading of the image of the document sheet when the vacant capacity of the memory becomes a third capacity, with the third speed being determined in accordance with an image reading condition;

setting the second speed in accordance with the image read condition; and setting the third speed based on data received from the external unit.

13. An image reading method according to claim 12, wherein said setting step sets the third speed before the start of the reading of the image of the document sheet.

14. An image reading apparatus according to claim 12, wherein said setting step sets one of the first speed and the second speed as the third speed.

* * * * *

UNITED STATES PATENT AND TRADEMARK OFFICE
CERTIFICATE OF CORRECTION

PATENT NO. : 5,825,512

DATED : October 20, 1998

INVENTOR(S) : HISAO OKITA

It is certified that error appears in the above-identified patent and that said Letters Patent is hereby corrected as shown below:

COLUMN 11:

Line 42, "in" (first occurrence) should read --is--.

COLUMN 12:

Line 28, "relatively" should read --relative--.

COLUMN 14:

Line 13, "sid" should read --said--; and
Line 31, "relatively" should read --relative--.

Signed and Sealed this

Twenty-fourth Day of August, 1999

Attest:

Q. TODD DICKINSON

*Attesting Officer*       *Acting Commissioner of Patents and Trademarks*